US005792413A

United States Patent [19]
Ang et al.

[11] Patent Number: 5,792,413
[45] Date of Patent: Aug. 11, 1998

[54] TOP COVER FOR INSTRUMENT PANEL WITH SEAMLESS AIR BAG DOOR AND METHOD OF MANUFACTURE

[75] Inventors: Leoncio C. Ang, Bloomfield Hills; Darlene B. Collins, Lathrup Village; Raymond A. Jakubowicz, Farmington Hills, all of Mich.

[73] Assignee: Chrysler Corporation, Auburn Hills, Mich.

[21] Appl. No.: 643,648

[22] Filed: May 6, 1996

Related U.S. Application Data

[63] Continuation-in-part of Ser. No. 521,764, Aug. 31, 1995, abandoned.

[51] Int. Cl.$^6$ ............................. B29C 49/24; B29C 49/50
[52] U.S. Cl. .................. 264/515; 264/139; 280/732; 425/523; 425/531
[58] Field of Search ............................. 264/515, 139, 264/138, 154, 156, 524; 280/728.3, 732; 425/523, 531

[56] References Cited

U.S. PATENT DOCUMENTS

| | | | |
|---|---|---|---|
| 3,124,842 | 3/1964 | Moormann | 264/536 |
| 3,793,421 | 2/1974 | Paubandt | 264/536 |
| 5,082,310 | 1/1992 | Bauer | 280/732 |
| 5,131,678 | 7/1992 | Gardner et al. | 280/732 |
| 5,316,822 | 5/1994 | Nishijima et al. | 428/138 |
| 5,394,602 | 3/1995 | Czapp et al. | 29/460 |
| 5,431,437 | 7/1995 | Nichols et al. | 280/731 |
| 5,447,328 | 9/1995 | Iannazzi et al. | 280/728.3 |
| 5,527,581 | 6/1996 | Sugawara et al. | 428/71 |

FOREIGN PATENT DOCUMENTS

| | | | |
|---|---|---|---|
| 57-083436 | 5/1982 | Japan | 264/524 |
| 5-084812 | 4/1993 | Japan . | |

*Primary Examiner*—Catherine Timm
*Attorney, Agent, or Firm*—Kenneth H. MacLean

[57] ABSTRACT

An instrument panel top cover with a seamless breakaway air bag door made as a unitary composite from multiple layers of plastics by extruding a parison with inner and outer layers of different recyclable plastics having different physical characteristics but which are from the same plastics family. The parison is injected and expanded with low pressure gas and forming dies with door scoring tools are closed thereover. The plastics will resultantly conform to the shaping surfaces of the dies to form the composite while the perimeter of the air bag door is scored. A quantity of the plastic material interior of the door score lines is removed after the top cover is removed from the dies so that a seamless or hidden door is provided that can readily break open at the peripheral scores to augment air bag operation when the air bag is triggered.

3 Claims, 3 Drawing Sheets

TOP COVER FOR INSTRUMENT PANEL WITH SEAMLESS AIR BAG DOOR AND METHOD OF MANUFACTURE

This application is a continuation-in-part of application U.S. Ser. No. 08/521,764 filed on Aug. 31, 1995 by L. Ang and D. Collins for "Soft Touch Top Cover and Method of Manufacture", now abandoned.

BACKGROUND OF THE INVENTION

In the above-identified co-pending application, a new and improved soft touch top cover and process for producing such covers for vehicle instrument panels is disclosed. Such covers are preferably a multi-layer composite formed from a plurality of different plastics from the same family to provide a quality part. The cover of the co-pending application features (1) good interior support for augmenting part handling and installation, and (2) desirable outer surface qualities for soft feel and quality appearance. Importantly, the multi-layer cover can be recycled as a unit (no layer separation required) to provide for improved life cycle management.

While the top cover of our co-pending application provides improved handling, appearance, recycling and other important benefits, there is no specific provision therein for an egress door to accommodate an occupant safety air bag desirable in many vehicles.

To this end, the present invention provides a new and improved instrument panel cover construction with an integral and discrete air bag egress door which, after installation, is visually indistinguishable from the surrounding areas of the panel cover. The cover is semi-stiff or sufficiently rigid for self support and can be readily handled and installed in an air bag equipped vehicle so that the "seamless" egress door is easily aligned with the air bag stored in the vehicle instrument panel. The air bag egress door can readily be torn open at formed perforated parting lines in the cover by the force of an expanding air bag in a safety related incident to provide for occupant protection. Since the door is torn open by air bag deployment and a new air bag and door is needed, part costs are minimized with this invention since a replacement top cover, or a portion thereof, containing the air bag door can be economically produced and installed onto the instrument panel.

BRIEF DESCRIPTION OF RELATED ART

U.S. Pat. No. 5,316,822, issued May 31, 1994, to Nishijima et. al. for "Cover For Vehicular Air Bag" discloses an air bag cover in a steering wheel formed from a main sheet of thermoplastic polyurethane elastomer which is covered with a liquid polyurethane base material applied thereover as a finish. Perforations are formed in the main body portion of the air bag cover to permit an inflated air bag to rip the cover open and expand into the vehicle passenger compartment.

U.S. Pat. No. 5,082,310 to Bauer discloses interior trim structure of an automotive vehicle having an air bag closure with a substrate section weakened in a pattern to form continuous doors or sub-sections. These sections split apart along "invisible" seams when the air bag is inflated and expands through the closure away from the trim structure. In this prior construction, a continuous foam layer covers the invisible seams and an outer skin layer overlies the plastic foam layer. The skin is pre-weakened in a matching pattern above the seams by being partially cut along the inside surface to a controlled depth.

While the co-pending patent application discloses a unique instrument panel top cover and ways of making a soft-to-touch and self-supporting instrument panel cover which facilitates handling and installation into a vehicle and which can be readily recycled when service life is completed, and while the above identified patents to Nishijima and Bauer disclose the provision of air bag doors in instrument panel and steering wheel constructions, they do not meet requirements for new and improved self-supporting top cover for instrument panels with seamless air bag doors integral therewith or for the new and improved methods of economically manufacturing such constructions.

In this invention at least two different plastics material of the same family having different structural characteristics are heated and extruded into a parison so that when associated molding dies are closed, a soft-to-touch vehicle instrument panel top cover that has sufficient stiffness or sufficient rigidity for easy handling, storage and installation is formed. Moreover, special tooling in the cover forming molding dies scores invisible breakaway or parting lines in the interior wall structure of the cover to define a break away air bag door that is concealed from observation by occupants of the passenger compartment of the vehicle. The door is living hinged along one side to ensure that the door remains attached to the top cover on air bag deployment. With assured door opening, the egress and guidance of an inflatable passenger protecting air bag is provided. Being of the same family of plastics materials the composite instrument panel top cover can be recycled as a unit when replacement is necessary.

An object, feature and advantage of this invention is to provide new and improved top cover for an automotive vehicle instrument panel formed as a composite from miscible layers of different plastics from the same family of materials. The composite has an interior portion that is effectively weakened by indentations or perforations at predetermined points to define an air bag door that readily tears away from the surrounding material in a defined manner on safety air bag deployment. A living hinge is provided for the door which holds the door by one edge to adjacent material of the panel cover when the air bag opens and deploys through the door. After air bag deployment, the top cover or portions thereof can be readily replaced with replacement made in accordance with this invention.

Another feature, object and advantage of this invention to provide a new and improved automotive instrument panel cover of plastics with an integral air bag door and method of manufacturing to produce a multi-layered cover of a plurality of different plastics material that are from the same family of materials so that they can be readily recycled together. The cover and method provide for a hidden deployment door for an air bag stored in the panel behind the cover which readily breaks away in a controlled manner to allow the air bag to be deployed as designed for occupant safety.

These and other feature, objects and advantages of the present invention would be more apparent from the following detailed description and drawings in which:

DESCRIPTION OF THE DRAWINGS

FIG. 3 is a pictorial view of a portion of tooling with cutting and hinge forming blades for forming an air bag door in the molded composite;

DETAILED DESCRIPTION OF THE PREFERRED EMBODIMENT

Figure 1:
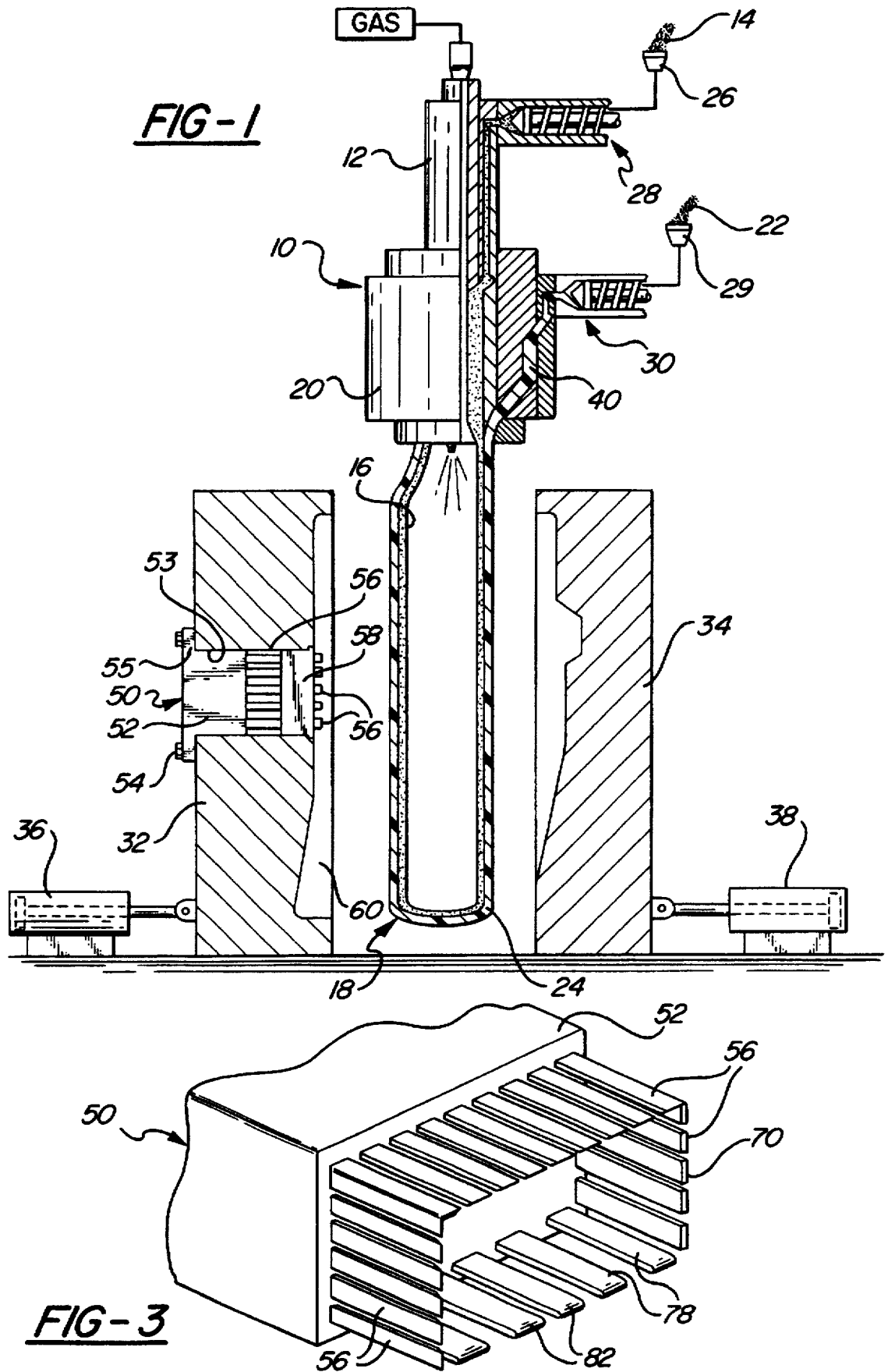
FIG. 1 is a diagrammatic side elevational view of a plastic extruder unit extruding a parison of plastics into a forming mold.

Turning now in greater detail to the drawings, FIG. 1 diagrammatically illustrates a co-extrusion plastics molding unit 10 with a first extruder 12 which extrudes heated first thermoplastic material 14 to form the interior layer or wall 16 of a depending parison 18. The unit 10 has a second extruder 20 operative to extrude heated second thermoplastics material 22 to form the outer plastics layer or wall 24 of the parison 18 as more particularly described in above identified co-pending application Ser. No. 08/521,764 whose disclosure is hereby incorporated by reference.

The first thermoplastics material 14 may be high density polyethylene or polypropylene filled with a suitable mineral such as talc or mica which is supplied in granular or flake form to the hopper 26 of a reciprocating screw injection unit 28. The second material 22 is preferably a different kind of thermoplastics, such as polyethylene based polyolefin elastomer (TEO) or polypropylene based thermoplastic elastomer (TPO), which is of the same family of plastics as the first plastics material but with the differing characteristics, such as strength, flexibility, finished appearance and feel. The two plastics materials synergize when joined in layers and molded to form an improved part with good inner strength from inner layers and an optimized outer appearance and soft feel from outer layers. As shown, the second material 22 is fed in a granular or flake form to hopper 29 of reciprocating screw injection unit 30.

The parison 18 is extruded into a pre-forming position between the opened forming tools or mold halves 32, 34 and is injected with low pressure gas, such as air or nitrogen that yieldably supports the walls of the parison in the expanded position.

Figure 2:
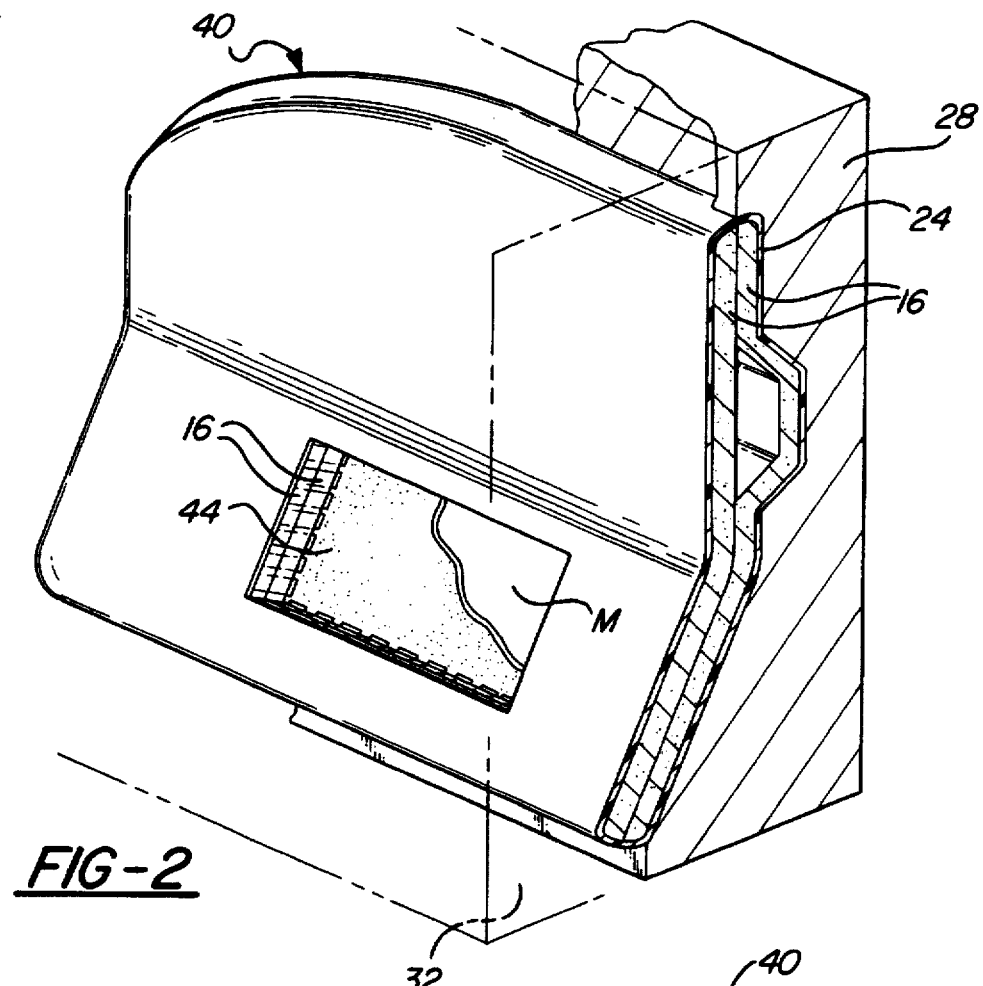
FIG. 2 is a pictorial view of a portion of the plastics material formed as a composite plastics top cover by the forming dies of the FIG. 1.
Figure 4:
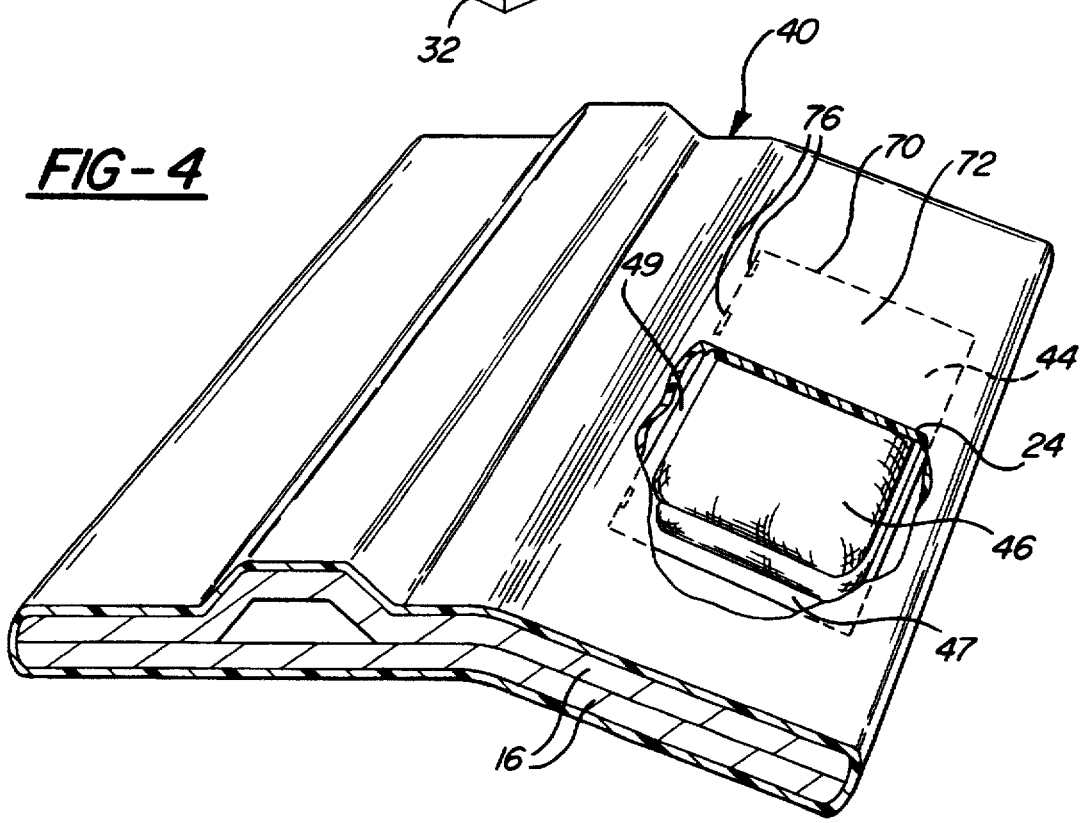
FIG. 4 is a pictorial view partially cut-away, of the top cover mounted on the instrument panel with the hidden air bag door disposed over an air bag supported by the panel.
Figure 6:
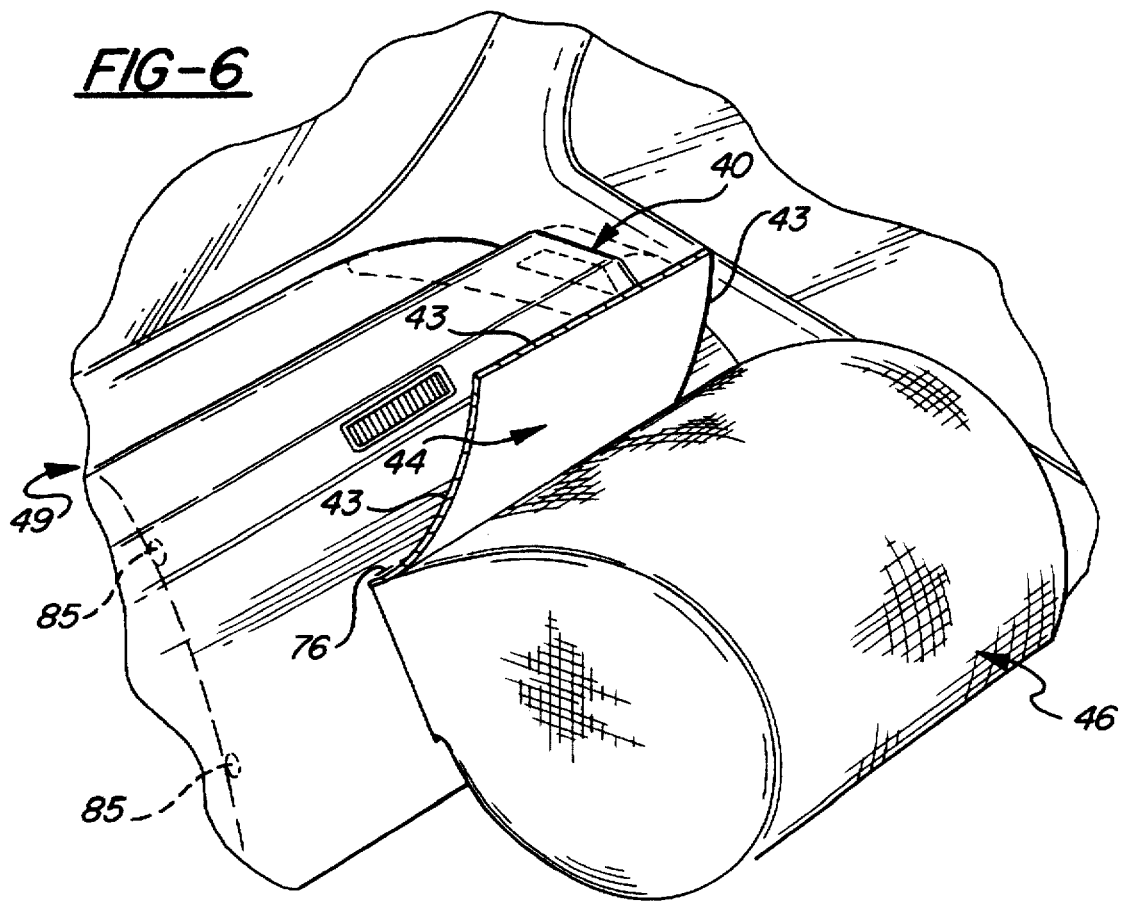
FIG. 6 is a pictorial illustration of the air bag being deployed through the top cover door of this invention.

The forming mold halves 32, 34, having inner profiling walls, can be moved by selectively actuated power cylinders 36, 38 to their closed position compressing the expanded parison 18 to form and profile the instrument panel top cover 40 shown in various stages in FIGS. 2, 4 and 6.

In this invention, the top cover 40 includes a hidden deployment door 44 for a supplemental inflatable restraint, or air bag 46 normally folded and stored in a pocket 47 in the instrument panel 49 which is available to provide vehicle occupant protection, particularly, when used with the occupant seat belt system of the vehicle. The hidden door 44 is a break-away type door which can be formed as the parison 18 is being molded into the composite instrument panel top cover 40.

More particularly, the mold half 32 includes an auxiliary door forming tool 50 which can be fixed or adjustably mounted therein. The auxiliary tool 50 has an enlarged base 52, which fits into a mating opening 53 in the mold and is releasably secured therein by threaded fasteners 54 extending through a flanged head 55 of the tool into the body of the mold half 32. A plurality of thin, blade-like cutters 56 mounted inboard in the base extend therefrom through matching openings 57 in a guide plate 58 releasably secured to the inner forming wall 60 of the mold half 32. These cutters extend in a predetermined pattern and pierce or perforate at least several thicknesses or layers of the top cover 40 to form the peripheral tear away edges 43 of the door 44 when the mold halves are closed together.

It is appreciated that the mold could be constructed so that one of the mold halves 32, 34 would be removed automatically by an air, hydraulic, electric motor, solenoid, or other powered device. A sharp cutting instrument or a hot trimming knife could be used to trim the molded part and could be an element of the interior mold mechanism. The trimming mechanism could also be a separate device that is attached to the mold halves 32, 34, tool 50, or could be free standing. By having this arrangement the trimming could still be done while the mold halves 32, 34 are in a closed mold position. The portion of the top cover 40 or material M that was cut could then be removed from the mold with a vacuum (negative pressure) or a mechanical holding device. Moreover, the mold halves 32, 34 could be moved or rotated so that a trimming action could take place on the top cover 40 in the mold. The trimming device would be a segment of the moved mold section.

Figure 5:
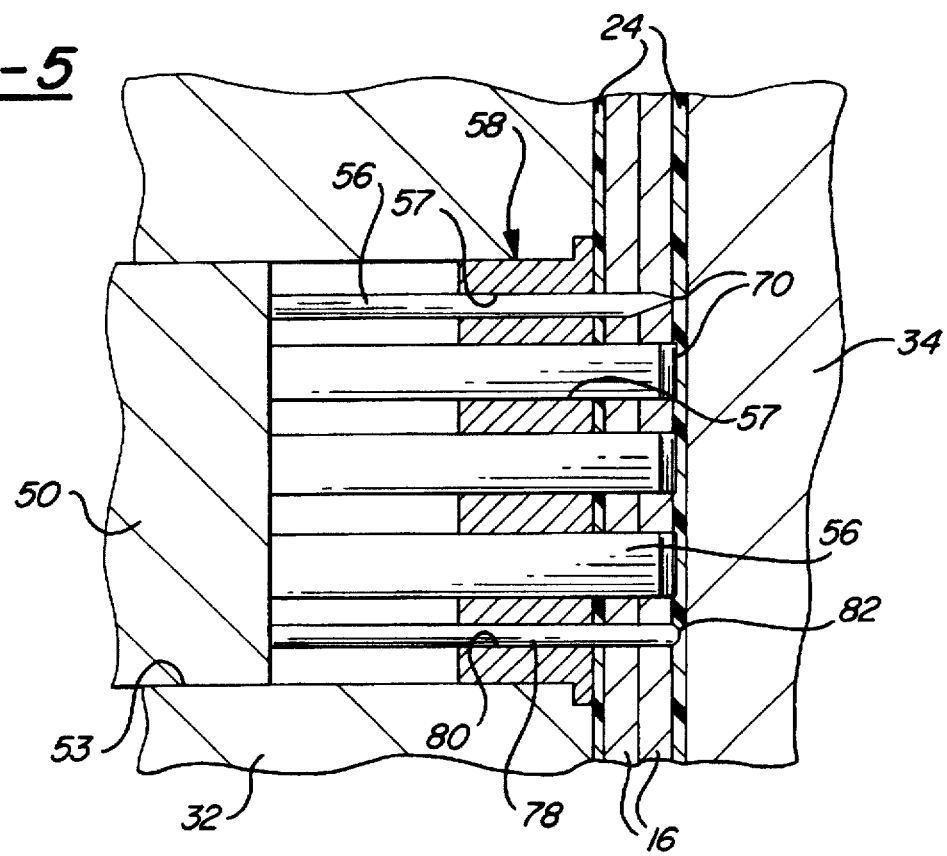
FIG. 5 is sectional view of the tooling for forming the air bag door as the top cover is being molded.

As shown in a closed mold position in FIG. 5, cutters 56 terminate at selected perforation lines 70 hidden beneath the outer skin or show surface 72 of the instrument panel top cover to form the peripheral break away edges 43 of the door 40. If a higher degree of door stiffness is desired, the blades may extend into the material by a reduced amount, such as through half of the thickness of plastics composite, to resultantly strengthen the door.

Importantly, a living door pivot hinge 76 is formed along the one edge of the door 44 which hinges and retains the door to the material of the top cover adjacent thereto on air bag deployment. To this end, hinge forming blades 78 extends in a line and forwardly from the base 52 of the tool 50 in a manner similar to the cutters 56. As with the cutters 56, these forming blades 78 extend through the closely matching openings 80 in the guide plates 58 so that when the forming molds are closed, the plastics material of the compressed parison does not enter into the tooling of the mold 32.

The ends 82 of the hinge forming blades are rounded to compressively load and evenly displace the material of the layers of the cover along a discrete line to form the living hinge 76 here shown extending along the top edge of the door 44.

Preferably, the hinge forming blade 78 are sufficiently shorter than the cutting blade 56 so that the living hinge contains significantly more material and is therefore stronger than the perforated or pierced edges of the door.

After the door 44 has been peripherally perforated or scored by the door forming cutters and the hinge forming blades, the top panel cover is allowed to cool in the mold and the mold halves are moved to an open position. The cover is then ejected from the mold by ejection pins or other suitable mechanism.

Moreover, after ejection, some of the layers of joined composite material M interior of the peripheral score lines 70 of the door is cut out or otherwise removed by suitable tools to a depth generally determined by the amount of penetration of the cutters and the hinge forming blades into the plastics material.

FIG. 2 illustrates part of the material M removed, and part still in place within the perimeter of the scored doorway yet to be removed. After such removal, only a reduced thickness layer of material exists to form the door 44. Since the top cover is flexible, and yet has sufficient rigidity, it can be easily installed onto the instrument panel 49 and as fastened there to such as by fasteners 85. As in the top cover of co-pending application 08/521,764, the inner layers 16 of the composite fuse together and provide the necessary stiffness for the cover while the outer layers 24 fuse to the inner layers at their interfaces provide the soft-to-touch finish.

In view of the fact that the cover has stabilized form, it can be readily installed onto the instrument panel with appropriate alignment of the door with the air bag 46 such as shown in FIG. 4 with the door disposed outwardly of and in alignment with the air bag 46.

FIG. 6 shows the air bag 46 being deployed in an emergency situation in which an air bag actuator triggers and inflates the air bag to force the door 44 open by tearing the perforated side and lower edges. The upper living hinge 86 keeps the opened door attached to the cover. With this deployment the air bag is guided into an appropriate direction so that the human occupant in the vehicle will be protected thereby.

In view of the fact that the instrument panel cover needs to be removed and replaced along with the air bag after air bag deployment, a new air bag would be packed within the instrument panel and a new top cover or a section thereof having an air bag door can be readily installed on the instrument panel using attachment fasteners 85 to minimize cost related to air bag deployment.

While preferred methods, embodiments of the invention have been shown and described, other embodiments will now become apparent to those skilled in the art. Accordingly, this invention is not to be limited to that which is shown and described but by the following claims.

What is claimed is:

1. A method of molding a top cover of plastics with a hidden tear away air bag door for an instrument panel of an automotive vehicle comprising the steps of:
   a. co-extruding a parison with discrete inner and outer layers respectively of first and second plastics materials joined at their interface,
   b. injecting a pressurized gas into said parison to blow and expand said parison,
   c. closing mold halves with inner forming walls over said expanded parison so that said parison is resultantly compressed to conform to the forming walls of said mold halves and so that said inner layers contact and join each other at common interfaces and form the top cover with a pre-determined thickness,
   d. piercing said layers to a pre-determined depth less than said predetermined thickness from one side of said parison with a series of aligned cutters arranged in a pre-determined pattern to score said layers and form a major portion of the perimeter of said tear-away door,
   e. opening the mold halves and removing the molded top cover therefrom, and
   f. removing the plastics material encompassed by said scores made by said cutters so that the hidden tear away air bag door is formed in said cover.

2. A method of molding a top cover of plastics with a hidden tear away air bag door for an instrument panel of an automotive vehicle comprising the steps of:
   a. co-extruding a parison with discrete inner and outer layers respectively of first and second plastics materials which are different from one another and are joined at a common interface,
   b. supplying said parison with a pressurized gas to expand said parison,
   c. closing mold halves with inner forming walls over said expanded parison so that said parison is compressed to conform to the forming walls of said mold halves and so that said inner layers thereof contact and join each other at common interfaces to thereby form the top cover,
   d. while said mold halves are being closed, piercing said layers to a pre-determined depth less than the thickness of said top cover from one side of said parison with a series of aligned cutters arranged in a pre-determined pattern to score said layers and form at least a major portion of the perimeter of said hidden tear-away door in said cover,
   e. forming a live hinge in said layers for said tear-away door when said layers are pierced by said cutters,
   f. opening the mold halves and removing the molded top cover therefrom,
   g. removing the plastics material peripherally encompassed by said scores and said live hinge so that the hidden tear-away air bag door is formed in said cover.

3. A method of making a top cover with an integral and hidden tear-away air bag door for an automotive vehicle comprising the steps of:
   a. extruding a parison with inner and outer layers of first and second plastics materials which are different from one another,
   b. injecting the parison with a gas to blow and expand the parison,
   c. closing mold halves with forming walls on said expanded parison so that the parison is resultantly compressed to form a layered composite that conforms to the forming walls of the mold halves and defines the top cover,
   d. piercing the layers of the composite while the parison is being compressed to form perforations extending to a depth in said layers less than the thickness of said composite in a pre-determined peripheral pattern that defines the perimeter of said tear-away door,
   e. removing the top cover from said mold halves, and
   f. removing some of the plastics material of said layers bounded by said perforations to complete the forming of said door.

* * * * *